US010951649B2

(12) United States Patent
Bjarnason

(10) Patent No.: US 10,951,649 B2
(45) Date of Patent: Mar. 16, 2021

(54) STATISTICAL AUTOMATIC DETECTION OF MALICIOUS PACKETS IN DDOS ATTACKS USING AN ENCODING SCHEME ASSOCIATED WITH PAYLOAD CONTENT

(71) Applicant: Arbor Networks, Inc., Westford, MA (US)

(72) Inventor: Steinthor Bjarnason, Fjerdingby (NO)

(73) Assignee: Arbor Networks, Inc., Westford, MA (US)

( * ) Notice: Subject to any disclaimer, the term of this patent is extended or adjusted under 35 U.S.C. 154(b) by 140 days.

(21) Appl. No.: 16/379,028

(22) Filed: Apr. 9, 2019

(65) Prior Publication Data
US 2020/0329069 A1 Oct. 15, 2020

(51) Int. Cl.
*H04L 29/06* (2006.01)
*G06N 7/02* (2006.01)
*H04L 12/24* (2006.01)

(52) U.S. Cl.
CPC .......... *H04L 63/1458* (2013.01); *G06N 7/02* (2013.01); *H04L 41/142* (2013.01); *H04L 63/1425* (2013.01); *H04L 2463/141* (2013.01)

(58) Field of Classification Search
None
See application file for complete search history.

(56) References Cited

U.S. PATENT DOCUMENTS

| 2007/0280114 A1* | 12/2007 | Chao | ...................... H04L 47/10 370/235.1 |
| 2011/0066896 A1* | 3/2011 | Ebina | ................... G06F 13/385 714/43 |

(Continued)

*Primary Examiner* — Michael Pyzocha
(74) *Attorney, Agent, or Firm* — Locke Lord LLP; Scott D. Wofsy; Christopher J. Capelli

(57) ABSTRACT

A method of detecting patterns in network traffic is provided. The method includes receiving a plurality of packets of network traffic, each packet having a payload populated with payload data and selecting payload lengths that occurred most frequently. For each of the selected payload lengths, a pattern template is generated using characters per position of the payload that satisfy a frequency criterion. A bit encoding scheme is assigned for each of the selected payload lengths and its associated pattern template. Each packet of the plurality of packets that has a payload length equal to any of the selected payload lengths and payload content that matches a pattern template generated for the payload is encoded into a single value. The single value uses the bit encoding scheme for the payload length and the pattern template matched. Each potential combination of fields representing the respective payload length and the pattern template is stored, with either all bits set per field when the field is active or no bits set per field when the field is inactive. A bitwise operation is performed on each encoded packet with the stored potential combinations. Results of the bitwise operation are stored in a sparse memory array. The results of the sparse array are sorted based on a number of the active fields and a number of occurrences of the respective results of the bitwise operation. The results of the sorting are provided to a mitigation device as an indication of whether an attack is underway and/or what type of attack is underway.

20 Claims, 4 Drawing Sheets

(56) References Cited

U.S. PATENT DOCUMENTS

| | | | |
|---|---|---|---|
| 2014/0136680 A1* | 5/2014 | Joshi | H04L 43/026 709/224 |
| 2014/0181484 A1* | 6/2014 | Callister | G06F 9/3851 712/229 |
| 2015/0101044 A1* | 4/2015 | Martin | G06F 11/3006 726/22 |
| 2018/0367566 A1* | 12/2018 | Ma | H04L 69/22 |
| 2019/0116157 A1* | 4/2019 | Kishikawa | H04L 63/1466 |
| 2019/0297096 A1* | 9/2019 | Ahmed | H04L 63/1425 |
| 2020/0044977 A1* | 2/2020 | Lee | G06K 9/6267 |
| 2020/0076841 A1* | 3/2020 | Hajimirsadeghi | H04L 41/16 |
| 2020/0128039 A1* | 4/2020 | Jalan | H04L 63/1416 |
| 2020/0201997 A1* | 6/2020 | Liu | G06F 9/5016 |

* cited by examiner

STATISTICAL AUTOMATIC DETECTION OF MALICIOUS PACKETS IN DDOS ATTACKS USING AN ENCODING SCHEME ASSOCIATED WITH PAYLOAD CONTENT

FIELD OF THE DISCLOSURE

Embodiments of the present disclosure relate generally to methods and systems for malware detection and mitigation, and specifically to algorithmically detecting malicious packets in Distributed Denial of Service ("DDoS") attacks using an encoding scheme associated with payload content.

BACKGROUND OF THE DISCLOSURE

Attacks, such as attacks utilizing flooding, denial of service, DDoS, viruses, worms, trojan horses, rouge applications, malware, exploits, spam, phishing, etc., are becoming an ever-increasing problem in today's Internet. For example, by sending large amounts of malicious packets, denial of service attacks can cause consumption and/or overload of scarce, limited, and/or non-renewable system and/or network resources, such as bandwidth, disk space, CPU time, and/or allocations thereof; destruction and/or alteration of configuration information, such as routing information; disruption of normal operating system functionality; and/or physical destruction and/or alteration of network components, etc.

DDoS attacks may be aimed at different types of services available on a network including, for example, DNS, HTTP (e.g., web traffic), encryption, time services, streaming services, VoIP. DDoS attacks may be aimed at vulnerable corporate services such as, for example, DNS that translates Internet names to addresses. DDoS attacks against DNS servers come in mainly two varieties. One attempts to shut down the DNS system specifically in relation to the target site so that no legitimate user can obtain a valid translation and make a request from that site, such as by altering the operation of the DNS server to provide an invalid translation. Another type of DDoS attack attempts to overload a DNS server directly with a flood of malicious packets that exceeds the capacity of the server, thereby preventing access to all sites whose address translations are dependent thereon.

Once an attack is successfully detected, standard mitigation tactics are typically inadequate in resolving a DDoS attack. Typical mitigation policies involve discarding all packets destined to a victim server without analyzing whether the packets originated from a legitimate user or an attacker. Also, standard approaches do not offer the ability to export real-time data to other apparatuses, nor do they allow an operator to configure a flexible, customized policy. It should be noted that, in many cases, the malicious packets sent by the attackers have similar structure and layout which, if detected, may be used to drop the malicious packets.

As such, a new, scalable, and robust DDoS Detection and Mitigation approach with inherent intelligence, which addresses all the shortcomings discussed above, is desirable. Such an approach should be capable of maintaining accurate state information to check for anomalous traffic patterns (to detect a variety of high rate DDoS attacks), should be capable of distinguishing between an attacker and a legitimate user when an attack is detected, should allow an operator to configure a flexible mitigation policy, and should be capable of operating without degrading the overall system performance (forwarding data path or control plane CPU).

SUMMARY OF THE DISCLOSURE

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method for detecting patterns using statistical analysis is provided. The method includes receiving a plurality of packets of network traffic, each packet having a payload populated with payload data and selecting payload lengths that occurred most frequently. For each of the selected payload lengths, a pattern template is generated using characters per position of the payload that satisfy frequency criterion. A bit encoding scheme is assigned for each of the selected payload lengths and its associated pattern template. Each packet of the plurality of packets that has a payload length equal to any of the selected payload lengths and payload content that matches a pattern template generated for the payload is encoded into a single value. The single value uses the bit encoding scheme for the payload length and the pattern template matched. Each potential combination of fields representing the respective payload length and the pattern template is stored, with either all bits set per field when the field is active or no bits set per field when the field is inactive. A bitwise operation is performed on each encoded packet with the stored potential combinations. Results of the bitwise operation are stored in a sparse memory array. The results of the sparse array are sorted based on a number of the active fields and a number of occurrences of the respective results of the bitwise operation. The results of the sorting are provided to a mitigation device as an indication of whether an attack is underway and/or what type of attack is underway.

In another aspect, a network monitoring system configured and operable to perform the disclosed method is provided.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
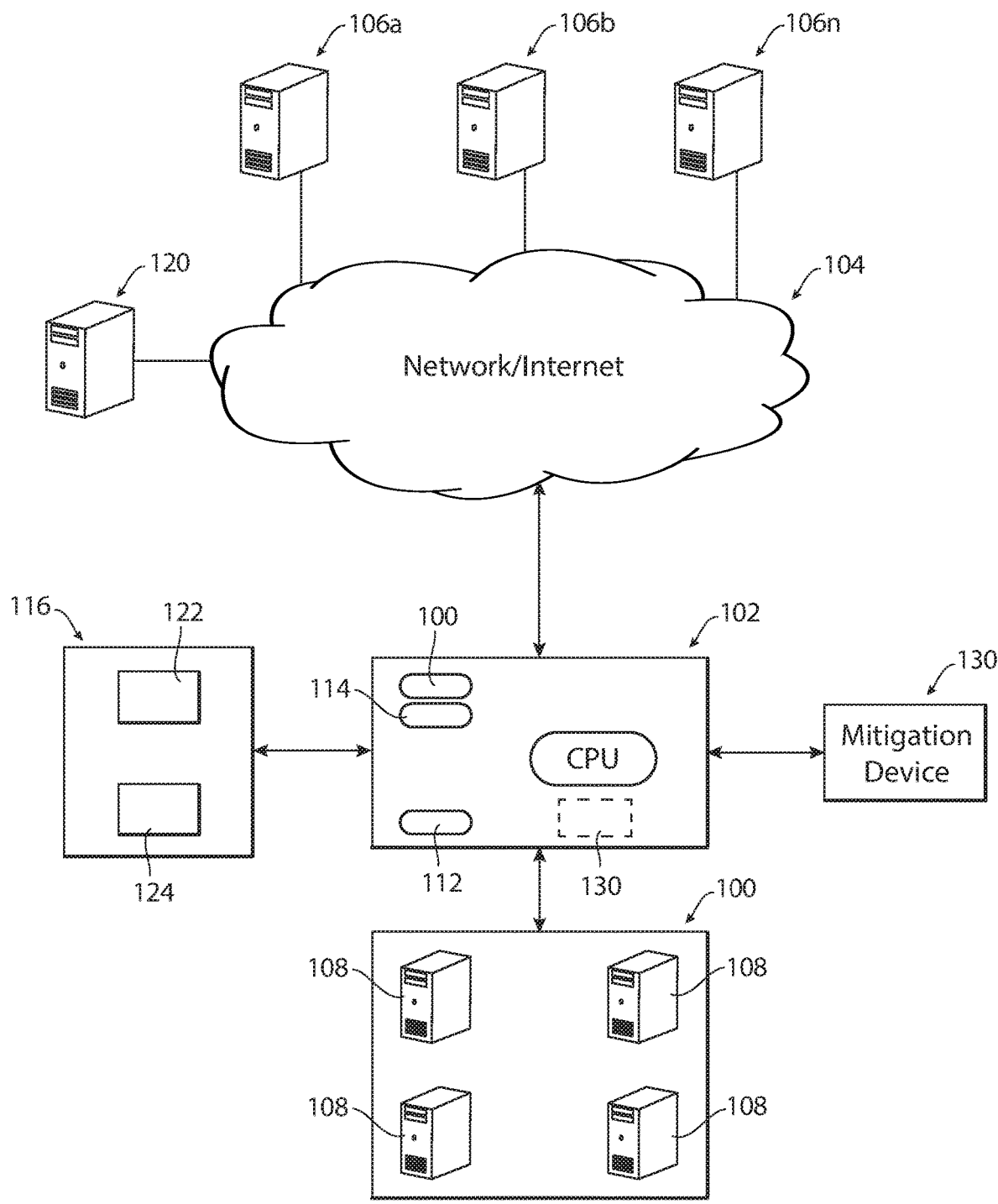
FIG. 1 is a schematic diagram showing network architecture and the relationship between an attack mitigation device and protected network according to one embodiment of the present disclosure.

The present disclosure is now described more fully with reference to the accompanying drawings, in which illustrated embodiments of the present disclosure are shown wherein like reference numerals identify like elements. The present disclosure is not limited in any way to the illustrated embodiments as the illustrated embodiments described below are merely exemplary of the disclosure, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present disclosure. Furthermore, the terms and phrases used herein are not intended to be limiting but rather to provide an understandable description of the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this disclosure as discussed below are can be configured as a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the disclosure based on the below-described embodiments. Accordingly, the disclosure is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

It is to be further understood the illustrated embodiments of the present disclosure describe a system, apparatus and method for detecting, avoiding, and/or mitigating the harmful effects of a DDoS attack on a computer system/device or network.

Turning now descriptively to the drawings, in which similar reference characters denote similar elements throughout the several views, FIG. 1 illustrates the relationship between a protected network 100, attack monitor device 102, Internet 104, and external host devices 106a, 106 b . . . 106 n.

In a typical implementation, the external host devices 106 a, 106 b . . . 106n (also referred to as external devices or host devices) attempt to connect to protected devices 108 within the protected network 100, typically via a private network or a public computer network such as the Internet 104. Examples of external host devices include servers, laptops, desktop computers, tablet devices, mobile phones, mobile computing devices, video games systems, televisions, and other similar devices and systems having Internet connectivity.

The attack monitor device 102 can be configured, for example, similar to devices such as Arbor Edge Device™ or Arbor Sightline™ by Arbor Networks, Inc. of Westford Mass. In embodiments, the protected network 100 protected by the attack monitor device 102 can be located between the Internet 104 and the protected network 100. In embodiments, the protected network 100 can be an enterprise network, such as a school network, business network, and government network, to list a few non-limiting examples. In other embodiments, the attack monitor device 102 is located within the Internet, service provider network, or enterprise network, rather than as a network edge as illustrated. It is to be appreciated that when deployed within the protected network, traffic can be diverted to the attack monitor device 102.

The attack monitor device 102 can include a packet processing system having an external high-speed network interface 110 and a protected high-speed network interface 112. Under current technology, these interfaces are capable of handling 1.0-100 Gbps, for example. The attack monitor device 102 may further include processors 114 that can process the packets received at interfaces 110 and 112. Additionally, a central processing unit (CPU), random access memory (RAM), and a storage medium 116 are used to further support the processing of the received packets, and are described in detail below in conjunction with FIG. 3. The storage medium 116 can also store results tables 124 used in the below described pattern detection process as well as other possible information, such as predefined filter rules. The attack monitor 102 can provide information to an attack mitigation device 130 or include an attack mitigation device that can generate alerts and/or assert countermeasures against an attack, such as to apply a filter using information provided by the attack monitor 102, such as to block, redirect, or drop packets detected by the filter.

In one implementation, the attack monitor device 102 authenticates all external host devices 106 a, 106 b . . . 106 n before allowing them to access the protected devices 108 within the protected network 100.

To protect against DoS attacks, the attack monitor device 102 distinguishes between requests from legitimate hosts 106a-106n and attack traffic from attacking host 120 by performing an analysis procedure that uses payload content analysis and statistical analysis, which can be combined with content and statistical analysis of fields in packet headers, using variable bit-encoding and application of bitwise operations, with results stored in a sparse memory array. A description of content and statistical analysis used for fields in packet headers that uses encoding is provided in concurrently filed patent application "AUTOMATIC DETECTION OF MALICIOUS PACKETS IN DDOS ATTACKS USING AN ENCODING SCHEME," to Steinthor Bjarnason, Andrew Beard, and David Turnbull, the entire contents of which are incorporated herein.

The term "bitwise operation" refers to an operation performed on two-bit patterns of equal lengths by positionally matching their individual bits to perform an operation on each pair of matched bits. Advantageously, the attack monitor device 102 can perform the analysis either on live or stored network traffic. In either case, the results of such analysis can enable the attack monitor device 102 to provide sophisticated attack protection services, such as blocking packets matching the detected patterns in attack traffic, including in an automated fashion without the need for operator intervention.

As noted above, typically, the attack monitor device 102 may employ a combination of different analysis procedures/ algorithms (e.g., payload content analysis, content of header fields, and statistical analysis) using variable bit encoding and application of bitwise operations. The attack monitor device 102 stores the results of the combined analysis in a data structure, such as a sparse memory array 124. The sparse memory array 124 stores a result of the bitwise operations that are performed to compare bit-encoded packets of the subset of network traffic to entries in the unique combinations table 122. The unique combinations table 122 is a data structure that stores each potential unique combination of fields representing the payload content of selected payload lengths. Each entry in the unique combinations table 122 includes a field that represents a payload length and a field that represents payload content. When determining the unique combinations, fields that have multiple bits are limited to having either a value of "0" for all bits (inactive) or "1" for all bits (active). As used herein, the term "data structure" refers to data that is defined or organized according to a structure.

The sparse memory array 124 can be generated during the analysis once the number of selected payload length and number of bits for to be used for variable bit-encoding is determined. The sparse memory array 124 is generated by allocating a fixed amount of memory for the sparse memory array 124 based on the number of bits used in the variable bit-encoding applied. The sparse memory array 124 also includes a counter per entry that keeps track of the number of times each entry matches a result of the bitwise operation performed on a packet.

The sparse memory array 124 can then be sorted, e.g., based on a score. These entries having the highest score represent data patterns that occur most frequently in the snapshot subset of network traffic. These patterns are most likely to be representative of suspicious traffic. Accordingly, the entries having the highest counter score can be used to generate a filter.

The filter can be applied by the attack monitor device 102, and/or a different threat management device, to manage the network traffic, such as to block, divert, or drop packets. The filter can be shared with other threat management devices for mitigating attacks to network traffic generated in different areas of the protected network 100 or for use mitigating attacks to other networks, such as other protected networks. The sparse memory array 124 can be sorted based on more than one factor. In the example shown, the sparse memory array 124 is sorted based on two factors. One factor is the value of the counter associated with the entries. The other factor is the number of fields in the entry that are active, meaning set to "1".

At least some of the protected devices 108 (e.g., DNS servers) may handle millions of requests every hour from many different external devices 106a-106n. Attack mitigation that analyzes characteristics of individual packets can be overwhelmed by the large volume of attack traffic and the large number of unique host addresses due to consumption of system resources, which can cause conventional DDoS protection solutions to be ill-suited to mitigate large-scale attacks.

Advantageously, the embodiments disclosed herein offer a novel approach that can detect and mitigate a large-scale attack campaign, event when a vast number of attack tools participate in attacking the protected network 100. As discussed further below, the attack monitor device 102 is configured to utilize payload content analysis and statistical analysis, and optionally packet header field content and statistical analysis, using variable bit-encoding and application of bitwise operations, with results stored in a sparse array to detect attack patterns with increased speed and precision than existing malicious attack mitigation solutions, providing increased effectiveness and an ability to swiftly respond to changes in attack patterns. In various embodiments, the combination of payload content analysis with and statistical analysis using variable bit-encoding and application of bitwise operations, with results stored in a sparse array, enables the attack monitor device 102 to automate the "detect-mitigate-analyze results" cycle without the need for operator intervention, thereby reducing time used to detect and mitigate sophisticated attacks. User experience is improved due to the improved speed and effectiveness of attack mitigation.

According to exemplary configuration illustrated in FIG. 1, the attack monitor device 102 may comprise a Client Edge (CE) device. The CE device can provide entry points into the protected network 100. In alternative configuration, the attack monitor device 102 may comprise a virtual device. In other words, at least some of the embodiments do not require the attack monitor device 102 to be a physical hardware device or to be located in a particular part of the network infrastructure, as long as the attack monitor device 102 can be in the path of the incoming traffic to the protected network 100.

Figure 2:
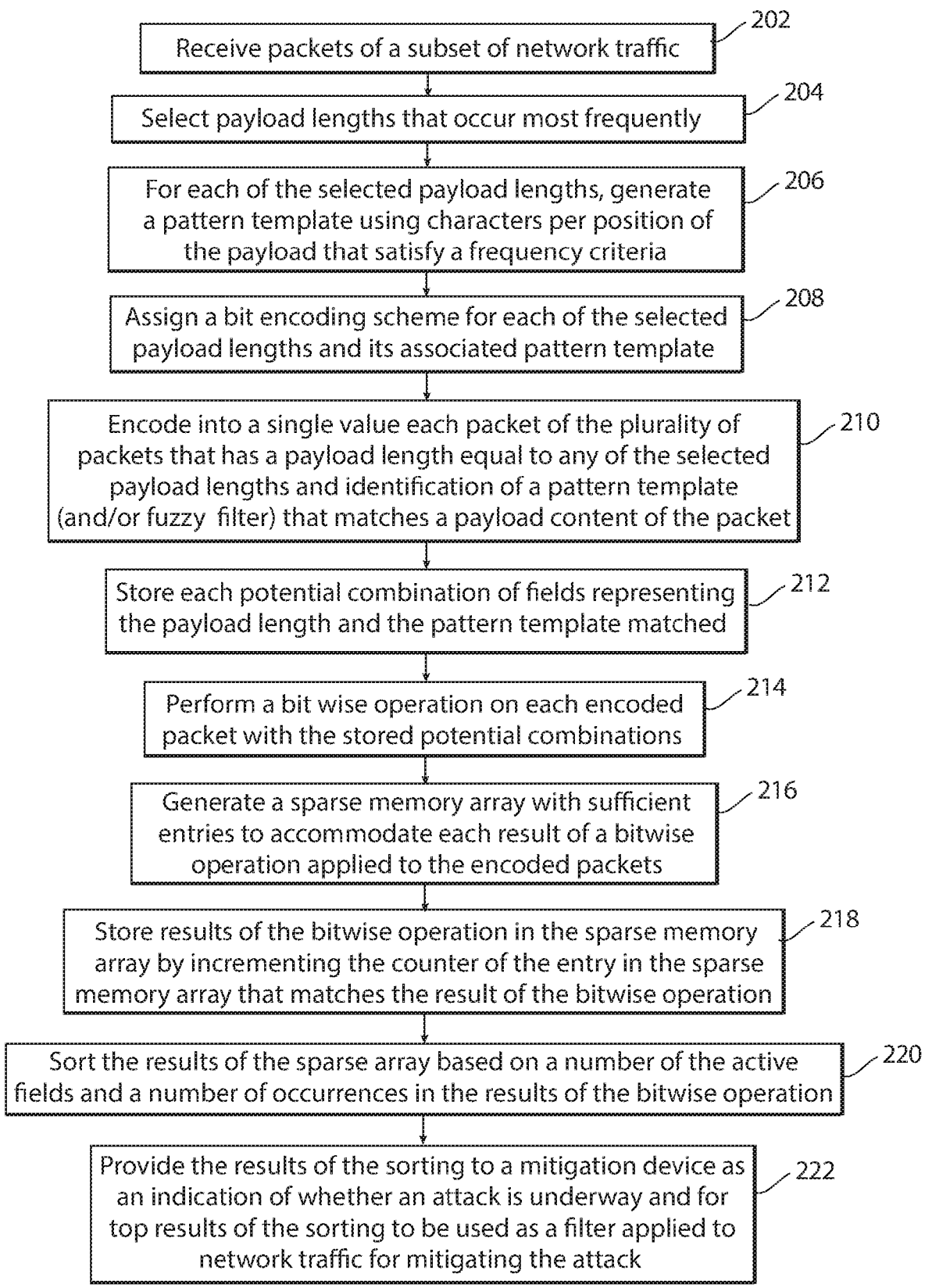
FIG. 2 is a flowchart illustrating a method for detecting patterns using statistical analysis in accordance with the illustrated embodiments.
Figure 3:
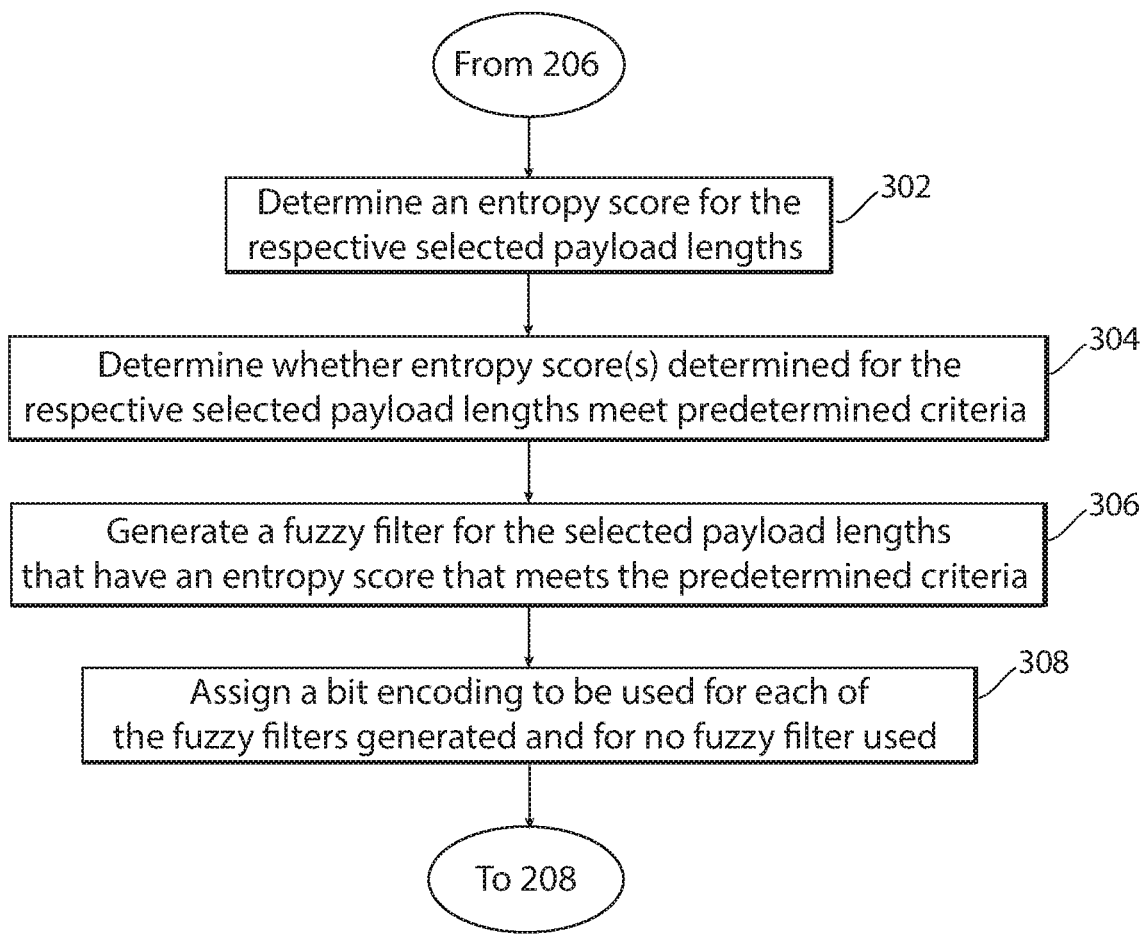
FIG. 3 is a block diagram of the attack mitigation device of FIG. 1, in accordance with an embodiment of the present disclosure.

FIGS. 2 and 3 shows exemplary and non-limiting flowcharts illustrating methods for mitigating network attacks in accordance with certain illustrated embodiments. The methods can be performed by an attack monitor device, such as attack monitor device 102. Before turning to description of FIGS. 2 and 3, it is noted that the flowcharts in FIGS. 2 and 3 show an example in which operational steps are carried out in a particular order, as indicated by the lines connecting the blocks, but the various steps shown in this diagram can be performed in a different order, or in a different combination or sub-combination. It should be appreciated that in some embodiments some of the steps described below may be combined into a single step. In some embodiments, one or more additional steps may be included. In some embodiments, on or more of the steps can be omitted.

While the embodiments describe the network attack monitor device with specific reference to steps directed to detect security and performance issues and/or mitigate detected breaches of a security policy, alternative data analyzing devices may be used provided they are adapted to apply content-specific logic to processing network traffic in order to detect underlying patterns using variable bit-encoding and applying bitwise operations to encoded packets.

Existing security solutions for different types of networks typically identify attacks by either analyzing individual packets for malicious content (such systems as, but not limited to, Intrusion Detection Systems (IDS) and Intrusion Protection Systems (IPS)) or by counting how many times a specific value is seen in packet flow (e.g., Netflow analysis systems). Even under ideal circumstances, significant computing resources are required to perform such analysis on pre-stored network data. In contrast, various embodiments of the present disclosure contemplate an alternative approach that utilizes payload content analysis and statistical analysis using variable bit-encoding and application of bitwise operations, combined with results stored in a sparse array to efficiently detect underlying attack patterns either in live network data, which can be detected and/or mitigated in situ in real time network traffic or in stored network traffic data. In one embodiment described below, to protect against DDoS attacks, the attack monitor device 102 utilizes this approach to take a snapshot of attack traffic (either volume or time based) and then calculate how often unique combinations of payload content (and optionally content of packet header fields) appear in the attack traffic.

More specifically, at step 202, the attack monitor device 102 receives a plurality of packets of network traffic, each packet having at least a header with a plurality of fields and payload data. Examples of fields include source IP, source port, destination IP, and destination port. Additionally, each packet has a packet length. The packets received at operation 202 may include a subset (snapshot) of network traffic flow records. In one embodiment, the packets received at operation 202 may be representative of particular network traffic transmitted over a network during a particular time interval, which may be loaded, for example, from a Packet Capture (PCAP) file or some other type of log file. In another embodiment, packets flowing through the network may be intercepted and analyzed by the mitigation device 102 to detect whether or not one or more components of the protected network 100 are being attacked and/or protect the one or more protected components 108 from being overloaded. In some embodiments, functionality of the mitigation device 102 may include selective interception of packets, selective modification of intercepted packets and subsequent release/reinsertion of the packets, modified or unmodified, and/or release of new packets, back into the general stream of network traffic.

Next, at operation 204, frequency analysis is applied to determine the frequency of different payload lengths in the received packets, and to select the payload lengths that occur the most frequently.

At operation 206, for each of the selected payload lengths a pattern template is generated using characters per position of the payload. Only characters that satisfy a frequency criterion are used for generating the pattern template. The pattern template can be, for example, a regular expression or a parser generator (e.g., Yacc™) or natural language processing. In embodiments, the pattern template can be the characters of the template. In embodiments, a character at a position in the payload satisfies the frequency criteria when it occurs a threshold number of times in the particular position of the payload of the received packets that have one of the selected payload lengths relative to the total number of received packets that have the selected payload length.

At operation 208, a bit encoding scheme is assigned for each of the selected payload lengths and its associated pattern template. A bit encoding scheme can also be assigned for at least one field of the header. [The fields of the header can be bit-encoded, each field using its own bit-encoding scheme based on its variability. In embodiments, only header fields having top values are bit-encoded, wherein top values are values associated with each field of the set of fields that satisfy a criterion as having occurred most frequently in the received plurality of packets of the network traffic as a function of a result of the frequency analysis.

When fuzzy filters are used, the bit-encoding scheme can also be assigned for a fuzzy filter generated for the payload length.

At operation 210, each of the received packets that has payload length equal to any of the selected payload lengths and payload content that matches the pattern templates generated for that payload length is encoded into a single value. The single value for each packet is encoded using the assigned encoding scheme for the packet's payload length and the corresponding pattern template that matches the packet's payload content. The single value can also be encoded using the assigned encoding scheme for one or more fields of the packet's header. In embodiments in which fuzzy filters, as described with respect to FIG. 3, the single value is further encoded to indicate that the fuzzy filter generated for the payload length matches the payload content.

At operation 212 each potential combination of fields representing the respective payload length and the pattern template is stored (e.g., in unique combinations table 122), with either all bits set per field when the field is active or no bits set per field when the field is inactive. When fuzzy filters are used, a special flag is used to indicate this. At operation 214, a bitwise operation is performed on each encoded packet with the stored potential combinations. In an example embodiment, performance of the bitwise operation includes performing a bitwise logic AND operation to the encoded packet and each of the respective entries of the unique combinations table.

At operation 216, in embodiments, a sparse memory array (such as sparse memory array 124) is generated with sufficient entries to accommodate each result of a bitwise operation applied to the encoded packets. The sparse memory array is generated with $2^B$ entries, wherein the single value assigned to each packet has B bits, where B is the total number of bits used to encode a packet. $2^B$ is a sufficient amount of entries to accommodate each result of a bitwise operation applied to the encoded packets. The sparse memory array is populated with all of the potential results of a bitwise operation performed at operation 214. Accordingly, each entry of the sparse memory array stores a unique combination of the B bits. Additionally, each entry is provided with a counter field that is used to track the number of times that entry's combination of bits matches a result of the bitwise operation performed at operation 214.

At operation 218, results of the bitwise operation are stored in the sparse memory array by incrementing the counter of the entry in the sparse memory array that matches the result of the bitwise operation. At operation 220, the results of the sparse array are sorted based on a number of the active fields and a number of occurrences of the respective results of the bitwise operation, as indicated by each entry's counter. At operation 222, the results of the sorting are provided to a mitigation device as an indication of whether an attack is underway and/or what type of attack is underway, for example to identify an attack and/or select a filter to apply to the network traffic to mitigate the attack. In embodiments, top results of the sorted sparse array can be decoded and used to select a template from a library of templates that are used for mitigating attacks. In embodiments, the top results include only sparse memory array entries that include three or more fields.

The decoded top entries of the sorted sparse memory array 124 having the highest counter values represent data patterns that occur most frequently in the snapshot subset of network traffic. When an attack is underway, these patterns are most likely to be representative of suspicious traffic and can be used effectively to detect or filter an attack during network operation.

The decoded top entries of the sorted sparse memory array 124 can be updated and displayed in real time, providing an operator a real time view of current traffic patterns and the ability to view changes in traffic patterns in real time.

In embodiments, the attack monitor device 102 can include the attack mitigation device 130 and use the results of the sorting to detect and/or mitigate an attack to generate an alert or apply countermeasures, such as applying a filter that uses the decoded top entries.

The top entries can be indicative of the type of attack. Accordingly, the attack mitigation device 130 can use the information provided by the sorted sparse memory array 124 and/or its top entries to automatically determine the type of attack and automatically enable countermeasures that are specific to the determined type of attack, and disable countermeasures that are not relevant to the determined type of attack. The advantage provided is avoidance of unneeded countermeasures than can interfere with healthy network traffic.

In embodiments, the method can be applied using a first plurality of packets of network traffic captured at a first time when an attack is not underway or when an identified attack is underway to obtain first results of sorting the sparse array. The method can then be applied using a second plurality of packets of network traffic captured at a second time different from the first time to obtain second results of sorting the sparse array. The second results can be compared to the first results to determine whether the conditions that existed at the first time for the first plurality of packets existed at the second time for the second plurality of packets. When an attack was not underway at the first time, the comparison can indicate whether or not an attack is underway at the second time. When an identified attack is underway at the first time, the comparison can indicate whether or not the identified attack is underway at the second time. The comparison can be used to compare the second results to an assortment of respective first results that can each be obtained under different known conditions that can include no attack or a variety of different known attacks. In this way, if an attack is underway, the comparison can be used to identify the attack from the different known attacks.

In embodiments, the plurality of packets of network traffic can be streaming, and the results of the sorting can be updated and provided to the mitigation device in real time.

In embodiments, results of the sorting can be aggregated from a plurality of different positions in the network, a plurality of different networks, and/or a plurality of different times. For example, if a new type of attack is detected at a first location in an enterprise network, the attack monitor device 102 at the first location can report the results of the sorting to other attack monitor devices in the enterprise network or outside of the enterprise network. This information can be aggregated by at the first location over time or at different locations in the enterprise network or in multiple networks.

With reference to FIG. 3, in embodiments, the attack monitor device can use a fuzzy filter when entropy satisfies a criterion, and the usage or not a fuzzy filter, and identification of the fuzzy filter used, can be encoded in accordance with an encoding scheme. The single value assigned to each packet can include bit encoding in accordance with the encoding scheme to indicate the fuzzy filter was applied, if a fuzzy filter was in fact applied.

A fuzzy filter uses a fuzzy hash, also referred to as a computing context triggered piecewise hash. A fuzzy hash can match inputs that have homologies, wherein a homology is a sequence of identical bytes in the same order, although the different inputs may be determined to be matching for including the sequence, even while having one or more sets of intervening bytes interspersed within the sequence that may have different content and/or length.

At operation 302, an entropy score is determined for the respective selected payload lengths. Determination of the entropy score is a function of a number of distinct characters used for each position of all of the payloads having one of the selected payload lengths and the total number of characters available to be used for the position.

At operation 304, a determination is made whether the entropy score(s) determined for the respective selected payload lengths meet predetermined criterion. For example, the predetermined criterion can be satisfied when the entropy score determined for the selected packet is below a threshold percentage of a maximum entropy score for the selected packet. The entropy score is a function of a number of distinct characters used for each position of all of the packets payloads having one of the packet selected payload lengths and the total number of characters available to be used for the position. In embodiments, the entropy score is determined by summing a ratio for each position of the number of distinct characters used for the position and the total number of characters available to be used for the position.

At operation 306, a fuzzy filter is generated for each of the selected payload lengths that have an entropy score that meets the predetermined criterion. Application of the fuzzy filter uses fuzzy hashing. A different fuzzy filter can be used for each of the selected payload lengths that meet the entropy criterion. In embodiments, the fuzzy filter is generated regardless of the outcome of the entropy score determination, and the fuzzy filter is only actually used for generating the single value at operation 210 if the entropy score meets the predetermined criterion.

At operation 308, the encoding scheme is used to encode each of the fuzzy filters applied, and the single value for the selected payload length is further determined using bit encoding to identify each of the fuzzy filters generated. The encoding scheme can also include a code that can be used to indicate that a fuzzy filter was not applied.

Operations 212-220 apply a statistical algorithm for generating all possible combinations and calculating which combinations of fields (e.g., fields in packet headers) and payload values are most frequently seen in attack traffic. Such a statistical algorithm is described in U.S. Publication No. 2018-0248908, having Ser. No. 15/443,525, filed Feb. 27, 2017, entitled "AUTOMATICALLY DETECTING PATTERNS IN DDOS PACKETS USING PRE-SELECTION OF FIELD CONTENTS AND SPARSE MEMORY ARRAYS, COMBINED WITH STATISTICAL ANALYSIS."

The payload can be split into two or more chunks of a selected number of bytes (for example 32 bytes). One or more of the chunks is selected for processing. For example, for all of the payloads, the first two chunks are processed, without limitation to which chunks or the number of chunks that are selected. Each selected chunk is processed separately. E.g., a pattern template is generated for each selected chunk. Furthermore, each selected chunk is treated as a "field" of the payload and is encoded independently. The fields for which potential combinations are stored further represent the individual selected chunks, and the potential combinations stored include each potential combination with each field representing a chunk, Processing each selected chunk includes: generating a pattern template associated with the selected chunk, assigning a bit encoding scheme for the selected chunk's associated pattern template, encoding the selected chunk into a single value using the encoding scheme for the selected chunk and the payload length of the chunk's payload, and performing a bitwise operation on each encoded chunk with the stored potential combinations.

In embodiments, when applying fuzzy filters, a fuzzy filter is applied using fuzzy hashing to each selected chunk of each selected packet.

By dividing the payload into chunks, the pattern template will be reduced in size but will still remain applicable. Experimentation shows that accurate results are achieved using selected chunks. On the other hand, when chunks are not used and the pattern template for the full payload is very large, there is a risk of increased complexity, which can result in fewer matches or false results due to the pattern template being relatively loose.

The chunks can be sized to be large enough to produce high-fidelity templates, but small enough to avoid over-matching or reduced matching. If the payload length is smaller than the chunk size, then the full payload can be used.

Implementation of operation of the method is now illustrated in an example. The example is shown on a small scale, but one skilled in the art will recognize that it can be applied to large-scale network traffic of a network environment.

In the example, TABLE 1 below, a snapshot of network traffic (e.g., received at operation 202) shown below includes ten packets, of which five packets (in rows 1, 3, 5, 7, and 9) are generated by an attacker:

TABLE 1

| Source IP | Destination IP | Packet size | Payload |
|---|---|---|---|
| 1.2.3.4 | 10.2.55.87 | 20 | abcdcfghijklmnopqrst |
| 4.5.6.7 | 10.2.55.87 | 22 | Mary had a little lamb |
| 8.9.10.11 | 10.2.55.87 | 20 | cbsjcndsjcnsdjsdcwqe |
| 12.13.14.15 | 10.2.55.87 | 6 | 0x921391238122 |
| 16.17.18.19 | 10.2.55.87 | 20 | yugbyehsncuynckefjup |
| 20.21.22.23 | 10.2.55.87 | 8 | 0x7237a38b8331f38b |
| 24.25.26.27 | 10.2.55.87 | 20 | fuewusbcbebsceucbeyr |
| 28.29.30.31 | 10.2.55.87 | 22 | John had a little wolf |
| 32.33.34.35 | 10.2.55.87 | 20 | bdbedbcuiencdkqczhod |
| 36.37.38.39 | 10.2.55.87 | 16 | 0x13489a27a20112ab837c387a38473bff |

As an example of implementation of operation 204, frequency analysis is used to select the most frequent payload length values. In an example, up to seven most frequent values are selected, each representing at least 14.2% of the total plurality of packets received.

Applying operation 204 to the example shown in TABLE 1 provides two selected payload lengths, namely 20 and 22, as shown in TABLE 2:

TABLE 2

| Payload length | Frequency | % of total |
|---|---|---|
| 20 | 5 | 50% |
| 22 | 2 | 20% |

In order to generate a pattern template for each of the selected payload lengths (20 and 22), a frequency analysis can be performed for each of these selected payloads to determine frequency of characters at each position of the payload. A frequency table is provided for each selected payload length to count the frequency of each character seen at each location in the payloads of the packets in the snapshot having that payload length. The frequency table for a selected payload length N has a size $N \times 2^x$, where x is the number of character value bits used to represent a character, and $2^x$ is the number of possible combination of bits for each character value. In this example the character values use ASCII, x=8 (since ASCII uses eight bits to represent each possible character), and $2^x$=256. Each entry in the frequency table corresponds to a unique combination of location in the payload and character value and has an associated counter.

As each packet of the snapshot is processed, the payload is extracted for each packet that has a payload length equal to one of the selected payload lengths. Otherwise, the packet is ignored. For each extracted payload, for each character in the payload, the counter of the appropriate entry in the appropriate frequency table is incremented, where the appropriate entry is based on the character's position and character value.

For example, when processing the first packet in TABLE 1, which has payload length 20, the payload 'abcdefghijklm-nopqrst' is extracted. For each character in the payload, frequency table F20 would be updated as follows:

Add 1 to entry 97 (ASCII value of character 'a') for position 0
Add 1 to entry 98 (ASCII value of 'b') for position 1
Add 1 to entry 99 (ASCII value of 'c') for position 2
Add 1 to entry 100 (ASCII value of 'd') for position 3
The same process would be followed for positions 4 to 19.

For the second packet in TABLE 1, which has payload length 22, the frequency table F22 would be updated in the same manner.

For the third packet in TABLE 1, which has payload length 20 and payload 'cbsjcndsjcnsdjsdcwqe', frequency table F20 would be updated as follows:

Add 1 to entry 99 (ASCII value of the character 'c') for position 0
Add 1 to entry 98 (ASCII value of 'b') for position 1, so that this entry's counter now has the value 2.
Add 1 to entry 115 (ASCII value of 's') for position 2
Add 1 to entry 106 (ASCII value of T) for position 3 The same process would be followed for positions 4 to 19.

After processing all of the packets in the snapshot, the frequency tables are sorted according to the counter values.

In the current example, the sorted frequency table F20 would have the following entries for positions 0-2:

Position 0:

| A | c | y | f | b |
|---|---|---|---|---|
| 1 | 1 | 1 | 1 | 1 |

Position 1:

| B | u | d |
|---|---|---|
| 2 | 2 | 1 |

Position 2:

| C | a | l | e | b |
|---|---|---|---|---|
| 1 | 1 | 1 | 1 | 1 |

Next, in embodiments, a decision can be made based on entropy whether or not to generate or use fuzzy filters. In other embodiments, fuzzy filters are not used, regardless of entropy. In such embodiments, the entropy determination can be omitted.

For each selected payload length (meaning for each frequency table), an entropy score can be generated to as an indication of the variability of the frequency table for each of the selected payload lengths. As an example of implementation of operation 302, one possible approach is to count how many distinct characters there are in each position of the frequency table, divided by the maximum number of characters (max) allowed per position (in the present example max=40). These values are then summed together to generate an entropy score.

EXAMPLES if position 0 contains 40 distinct values, the entropy score for position 0 would be (40/40)=1.

If position 1 contains 10 distinct values, its entropy score would be (10/40)=0.25.

Regarding the example frequency tables above, frequency table F20 has a calculated entropy score of 2.225 and frequency table F22 has a calculated entropy score of 0.75.

The max entropy score for frequency table F20 would be 20 (each position having an entropy score <=1, totaling a maximum of 20 for the 20 positions in the payload). Similarly, the max entropy score for frequency table F22 would be 22.

As an example of implementation of operation 304, the calculated entropy score can be compared to a threshold value. The threshold value can be a based on a maximum percentage of the maximum entropy score. For example, when the maximum percentage is 40%, the threshold value for F22 would be is 8.8 (maximum entropy score 22×maximum percentage 40%=8.8). The calculated entropy score for F22 is 0.75, which is below the threshold value 8.8, allowing the use of fuzzy filters for F22. However, if the calculated entropy score is higher than then threshold value, the fuzzy filter for that specific payload length is not generated or is disabled.

Generation and/or usage of the fuzzy filters for each selected payload length can be conditional on the entropy score meeting a predetermined criterion. In the example shown, the predetermined criterion is satisfied when the entropy score does not exceed a predetermined threshold.

Fuzzy filters can detect similarity between character strings, even when the character strings are not identical. Application of a fuzzy filter can result in a score that indicates the degree of similarity. Payloads generate by attackers are often similar in nature. Accordingly, a fuzzy filter can be applied to increase a confidence level in the content and statistical analysis applied for detecting an attack. A fuzzy filter is generated for each selected payload length using fuzzy hashing. The payload value from the first packet entered in the corresponding frequency table can be used to generate the fuzzy filter, however the disclosure is not limited to a particular packet. The fuzzy hash uses homologies to determine the level of similarity between other packets entered in the frequency table to the filter. The score generated by applying the fuzzy filter can be a binary score (Similar, Not Similar) or can have multiple levels of similarity (e.g., a score from 1 to 10, 10 indicating identical).

As an example of implementation of operation 206, a regular expression pattern template (referred to below as regex) is generated for each selected payload length (meaning for each frequency table). For each position of the frequency table, the pattern template is generated using only values which represent at least a threshold percentage (e.g., 1%, without limitation to a specific percentage) of the total number of packets having that payload length associated with the frequency table. Generation of the regular expression can apply the following rules:

If more than one character is used per position in the packets, the regex includes a range of characters for that position.

If the there are no characters for a position that represent more than 1% of characters used for that position, the regex uses the value '.', which represents any character, for that position.

An artificial limit is set on how many characters are allowed in the regex for each position, for example 40.

Below is an example regex generated for frequency table F20:

[acyfb][bud][csgeb][djbwe][ecyud][fnesb][gdhbc][shcu][ijnb][cej][nkub][slyc][dmnc][nj cek][oskuq][cpde][qcfbz][rwjeh][squyo][teprd]

Below is an example regex generated for frequency table F22:

[MJ][ao][rh][yn] had a little [lw][ao][ml][bf]

As an example of implementation of operation 208, an encoding scheme variable bit encoding is generated for each of the selected payload lengths. The encoding scheme encodes (a) the payload length, (b) whether the associated regex matches, (c) the fuzzy filter score or an indication that the fuzzy filter is disabled due to poor entropy (this can be omitted if fuzzy filters are not used).

In the example, the selected payload lengths 20 and 22 would have the encoding schemes shown in TABLE 3:

TABLE 3

| Payload length | Regex | Fuzzy filter | Bit encoding |
|---|---|---|---|
| 20 | [acyfb][bud][csgeb][djbwe][ecyud][fnesb][gdhbc][shcu][ijnb][cej][nkub][slyc][dmnc][njcek][oskuq][cpde][qcfbz][rwjeh][squyo][teprd] | <F1 enabled> | 01 |
| 22 | [MJ][ao][rh][yn] had a little [lw][ao][ml][bf] | <F2 enabled> | 10 |

As an example of implementation of operation 210, payload of packets of the snapshot that have the selected payload length are encoded using the encoding scheme. For example, a packet having a payload of length 20 is assigned the code "01" if its content matches the corresponding regex and the corresponding fuzzy filter (if used). Similarly for a packet having a payload length of 22, it is assigned the code "10". Applying the encoding scheme to the small snapshot of TABLE 1, five packets would be assigned code "01" and two packets would be assigned code "10".

Figure 4:
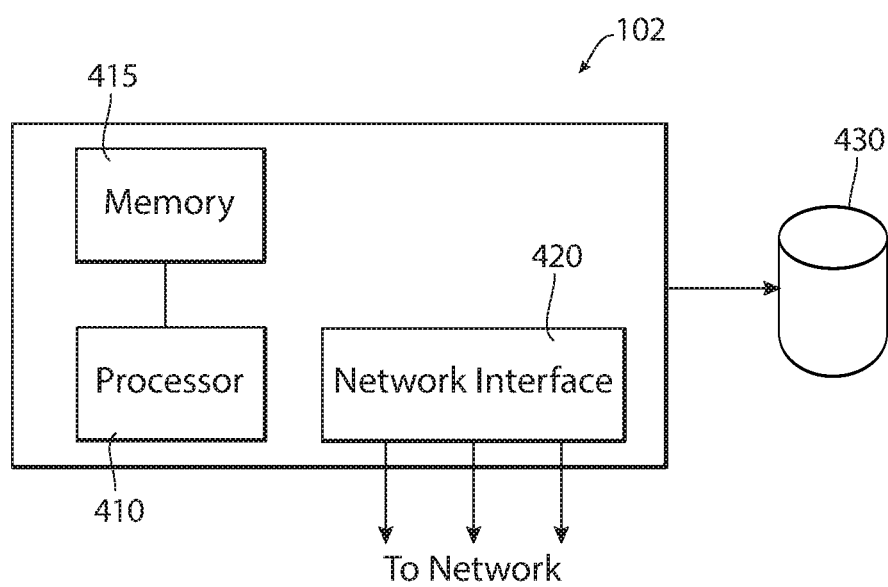
FIG. 4 is an exemplary screenshot of a user interface displaying malicious attack detection results, according to one or more embodiments discussed herein.

With reference now to FIG. 4, illustrated is an exemplary and non-limiting block diagram of the attack monitor device 102 constructed according to an illustrated embodiment. The attack monitor device 102 is communicatively coupled to the protected network 100 and to the database 430 (i.e., storage medium 116 storing results tables 124 and/or storing network traffic flow information), as shown in FIG. 4, and is at least configured to execute the method for mitigating network attacks as described in greater detail above. The attack monitor device 102 can include a processor 410 coupled to a memory 415 and a network-interface module 420. The network-interface module 420 allows the communication with the protected network 100. The processor 410 uses instructions stored in the memory 415 to execute attack detection tasks as well as to control and enable the operation of the network-interface module 420.

Attack mitigation device 130, whether external or internal to the attack monitor device 102, includes a processor, memory and network interface, which can be fully or partially shared with the any of the respective processor, 410, memory 415, and network interface 420. The attack mitigation device 130, whether external or internal to the attack monitor device 102, can similarly be coupled to the protected network 100 and to the database 430.

In summary, various embodiments of the present disclosure disclose a novel approach to detecting data patterns by employing a combination of different analysis procedures/algorithms (e.g., content analysis and statistical analysis). In one embodiment, this approach takes a different perspective on how to provide an effective response to a DoS/DDoS type of attack than do conventional approaches. The disclosed approach provides a number of advantages. In one aspect, software-programming code embodying the present disclosure provides an ability to perform analysis either on live or stored network data. In another aspect, the attack monitor device 102 may use the results of the attack detection analysis to block packets matching detected patterns in an automated fashion. As yet another advantage, although the method depicted in FIG. 2 is described with reference to the IP packet payload analysis, it is not limited thereto. For example, the disclosed processing functionality performed by the attack monitor device 102 may be applicable to packet header analysis, as well as any other network traffic analysis.

The various embodiments disclosed herein can be implemented as any combination of hardware, firmware, and software. Moreover, the software can be implemented as an application program tangibly embodied on a program storage unit or computer readable medium. The application program may be uploaded to, and executed by, a machine comprising any suitable architecture. The machine can be implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of detecting patterns in network traffic, the method comprising:
receiving a plurality of packets of network traffic, each packet having a payload populated with payload data;
selecting payload lengths that occurred most frequently;
for each of the selected payload lengths, generating a pattern template using characters per position of the payload that satisfy frequency criterion;
assigning, a bit encoding scheme for each of the selected payload lengths and its associated pattern template;
encoding into a single value each packet of the plurality of packets that has a payload length equal to any of the selected payload lengths and payload content that matches a pattern template generated for the payload, the single value using the bit encoding scheme for the payload length and the pattern template matched;
storing each potential combination of fields representing the respective payload length and the pattern template, with either all bits set per field when the field is active or no bits set per field when the field is inactive;
performing a bitwise operation on each encoded packet with the stored potential combinations;
storing results of the bitwise operation in a sparse memory array;
sorting the results of the sparse array based on a number of the active fields and a number of occurrences of the respective results of the bitwise operation; and
providing the results of the sorting to a mitigation device as an indication of whether an attack is underway and/or what type of attack is underway.

2. The method of claim 1, further comprising applying a fuzzy filter using fuzzy hashing to a payload value of a selected packet having a payload length equal to one of the selected payload lengths, wherein the single value further uses bit encoding to indicate whether or not the fuzzy filter was applied and to identify which fuzzy filter was used.

3. The method of claim 2, further comprising determining whether to apply the fuzzy filter for the respective selected payload lengths based on whether an entropy score determined for the payload length meets a predetermined criterion.

4. The method of claim 3, wherein the predetermined criterion is satisfied when the entropy score determined for the selected packet is below a threshold percentage of a maximum entropy score for the selected packet.

5. The method of claim 3, wherein the entropy score is a function of a number of distinct characters used for each position of all of the payloads having one of the selected payload lengths and the total number of characters available to be used for the position.

6. The method of claim 5, wherein the entropy score is determined by summing a ratio for each position of the number of distinct characters used for the position and the total number of characters available to be used for the position.

7. The method of claim 1, wherein each packet has a header and the bit encoding scheme is further assigned for at least one field of the header and the single value is encoded using the encoding scheme for the at least one field of the header.

8. The method of claim 1, wherein the pattern template is a regular expression.

9. The method of claim 1, wherein a character satisfies the frequency criterion at a position when it is occurs a threshold number of times in that position of the payload of the received of packets that have one of the selected payload lengths relative to the total number of received packets that have the selected payload length.

10. The method of claim 1, further comprising: for each of the selected payload lengths, dividing the payload into two or more chunks, wherein:
one or more of the chunks is selected for processing,
the fields for which potential combinations are stored further represent the individual chunks, and the potential combinations stored include each potential combination with each field representing a chunk,
each selected chunk is processed separately, and
the processing of each selected chunk includes generating a pattern template associated with the selected chunk, assigning a bit encoding scheme for the selected chunk's associated pattern template; encoding the selected chunk into a single value using the encoding scheme for the selected chunk and the payload length of the chunk's payload, and performing a bitwise operation on each encoded chunk with the stored potential combinations.

11. The method of claim 10, wherein when applying fuzzy filters, a fuzzy filter is applied using fuzzy hashing to each selected chunk of each selected packet.

12. The method of claim 1, further comprising:
creating a sparse memory array; and
storing results of the bitwise operation in the sparse array, the sparse memory array being sized as a function of a number of bits per packet in the single value.

13. The method of claim 1, further comprising:
decoding top entries of the sorted sparse memory array; and
generating a filter that includes data from the decoded top entries.

14. The method of claim 13, further comprising filtering the network traffic using the filter.

15. The method of claim 1, further comprising selecting a template from a library of templates for mitigating the attack based on the results of the sorting.

16. The method of claim 1,
wherein first results of the results of the sorting are determined for a first plurality of packets of the received plurality of packets that were captured at a first time when an attack is not underway,
wherein second results of the results of the sorting are determined for a second plurality of packets of the received plurality of packets that were captured at a second time different than the first time, and
wherein the method further comprises comparing the first and second results to determine whether an attack is underway or identify an attack.

17. The method of claim 1, wherein the plurality of packets of network traffic are streaming and the results of the sorting are updated and provided to the mitigation device in real time.

18. The method of claim 1, further comprising aggregating results of the sorting from a plurality of different positions in the network, a plurality of different networks, and/or a plurality of different times.

19. A network monitoring system configured and operable to:
receive a plurality of packets of network traffic, each packet having a payload populated with payload data;
select payload lengths that occurred most frequently;
for each of the selected payload lengths, generate a pattern template using characters per position of the payload that satisfy a frequency criterion;
assign, a bit encoding scheme for each of the selected payload lengths and its associated pattern template;
encode into a single value each packet of the plurality of packets that has a payload length equal to any of the selected payload lengths and payload content that matches a pattern template generated for the payload, the single value using the bit encoding scheme for the payload length and the pattern template matched;
store each potential combination of fields representing the payload length and the pattern template, with either all bits set per field when the field is active or no bits set per field when the field is inactive;
perform a bitwise operation on each encoded packet with the stored potential combinations;
store results of the bitwise operation in a sparse memory array;
sort the results of the sparse array based on a number of the active fields and a number of occurrences of the respective results of the bitwise operation; and
provide the results of the sorting to a mitigation device as an indication of whether an attack is underway and/or what type of attack is underway.

20. The network monitoring system of claim 19, wherein the network monitoring system is further operable and configured to
decode top entries of the sorted sparse memory array; and
generate a filter that includes data from the decoded top entries.

* * * * *